United States Patent

[11] 3,548,941

| [72] | Inventors | John W. Graham<br>Bellaire;<br>Gerald D. Ortloff, Houston, Tex. |
|---|---|---|
| [21] | Appl. No. | 764,198 |
| [22] | Filed | Oct. 1, 1968 |
| [45] | Patented | Dec. 22, 1970 |
| [73] | Assignee | Esso Production Research Company<br>a corporation of Delaware |

[54] CYCLIC INJECTION OF SURFACTANT FOR INCREASING OIL RECOVERY FROM FRACTURED MATRIX RESERVOIRS
5 Claims, 2 Drawing Figs.

[52] U.S. Cl. .................................................... 166/273,
166/274
[51] Int. Cl. ........................................................ E21b 43/22

[50] Field of Search............................................. 166/274,
273, 275, 271, 268, 263, 252

[56] References Cited
UNITED STATES PATENTS

| 2,792,894 | 5/1957 | Graham et al. ............... | 166/274X |
| 3,346,047 | 10/1967 | Townsend et al. ............ | 166/273 |
| 3,437,140 | 4/1969 | Foster et al. .................. | 166/273 |

*Primary Examiner*—Stephen J. Novosad
*Attorneys*—James A. Reilly, John B. Davidson, Lewis H. Eatherton, James E. Reed and James E. Gilchrist

ABSTRACT: A method for recovering oil from a fractured matrix reservoir by injection of a solution containing a surface active agent in which the concentration of surface active agent is cyclically increased and decreased.

PATENTED DEC 22 1970

3,548,941

GERALD D. ORTLOFF
JOHN W. GRAHAM
INVENTORS

BY
Lewis H. Gatherton
ATTORNEY

CYCLIC INJECTION OF SURFACTANT FOR INCREASING OIL RECOVERY FROM FRACTURED MATRIX RESERVOIRS

BACKGROUND OF THE INVENTION

1. Field of the Invention

This invention relates to a process utilizing wells for the insertion of a fluid in the interstices of a porous earth formation. The fluid is inserted in the formation through an input well to enable the withdrawal of formation fluids from a producing, output well.

2. Description of the Prior Art

Many reservoirs from which oil and gas are produced are relatively homogeneous with respect to porosity and permeability of the formation. However, it is recognized that a large number of producing formations are naturally and highly fractured. A typical example of such a reservoir is the Spraberry trend of West Texas.

Highly fractured reservoirs consist of two distinct elements, fractures and matrix, each having its characteristic porosity and permeability. The oil-bearing porous rock matrix is interlaced by an extensive network of naturally occurring fractures or fracturelike channels characterized by fluid conductivities which may exceed the matrix permeability by a factor of several thousand.

Experience has proven that the recovery of oil from such reservoirs by normal production practices is often less efficient than from unfractured reservoirs having generally the same matrix character and initial fluid saturations. During primary production, the natural reservoir pressure is rapidly depleted through the highly conductive fracture system, typically leaving more than 90 percent of the crude oil in the reservoir. In essentially the same manner, conventional methods of secondary recovery have failed to displace substantial volumes of oil.

Conventional waterflooding techniques are relatively ineffectual in highly fractured reservoirs. The floodwater tends to flow through the interconnected fissures, grossly bypassing the oil which is in the matrix. As a result, only that oil which is left in the fractures following primary production is recovered in conventional waterflooding. Waterflooding in these reservoirs is characterized by early water breakthrough and rapidly reached uneconomic producing water-oil ratios.

One modification of the conventional waterflooding process which has achieved limited success is countercurrent imbibition. In a fractured reservoir, if the rock surfaces of a matrix system are sufficiently water wet, limited recovery by this method is possible. Water is injected into the fractures and allowed to remain in contact with the rock matrix for a period of time ranging from weeks to several years. During this contact period, water is spontaneously imbibed into the matrix, and there is a countercurrent expulsion of oil into the fracture system. The expelled oil is swept through the fractured system to production wells where it is recovered in the conventional manner. Waterflood recovery by countercurrent imbibition may be further improved by the use of surface active agents. The effect of such surfactants is to further increase the water wettability of the rock matrix and to reduce the interfacial tension between the oil and water phases. This increases the ability of the rock to imbibe water and to expel oil.

Another modification of the waterflooding process as applied to fractured reservoirs is known as cyclic pressure flooding or "pressure pulse" flooding. Cyclic pressure flooding is accomplished by alternately increasing and decreasing the net production and injection rates which thereby create a cyclic pressure differential between the rock matrix and the fracture system.

The cyclic variations in pressure force water into the rock matrix and oil from the matrix into the fractures and assist the imbibition process. In the initial phase of cyclic pressure flooding, net fluid production is limited to a rate substantially below the volumetric water influx, whereby the reservoir pressure is raised to a high level. This phase of the cycle is known as the injection phase, during which little or no oil is produced. The pressure buildup in the fracture system forces a portion of the injected water to enter the porous matrix. After a period of time sufficient to permit a substantial approach toward pressure equilibrium between the fracture system and the porous matrix, the production phase of the cycle is begun. Continued water injection is limited to a rate substantially below the net fluid production rate in order to reduce the reservoir pressure. Consequently, the pressure difference between the fracture system and the matrix blocks is reversed, thereby forcing oil from the pore system into the fracture system, where it is swept toward the production wells and recovered in a conventional manner.

Surface active agents or surfactants are employed in both the countercurrent imbibition process and the cyclic pressure flooding process to increase the wettability of the rock matrix and to lower the interfacial tension between the formation water and crude oil. The surface active agent will increase oil productivity in a fractured matrix reservoir for a number of reasons including decrease of the interfacial tension between the oil emerging from the rock matrix into the fracture system and the water within the fractures, increase in the tendency of stagnant oil globules to be removed from the fracture system, thus providing more surface area for imbibition, and increase of the penetration of water into dead-end, oil-filled fractures that would not otherwise accept water.

To maximize oil productivity from fractured matrix reservoirs in which surfactant flooding is used, it is desirable to maintain the surfactant concentration in the fracture system at or near the level required for lowering the interfacial tension by a desired amount throughout the recovery area. To accomplish this in a reasonably short time, the injected concentration must be considerably higher than the required minimum level because the continuous diffusion of surfactant from the fractures into the matrix reduces the concentration in the fractures. This causes the surfactant concentration in the fracture-matrix system around the injection well to be much higher than necessary to adequately lower the interfacial tension. Such excessively high, injected surfactant concentrations are extremely detrimental to the economics of waterflooding operations in fractured matrix reservoirs.

SUMMARY OF THE INVENTION

It has been found that by alternately raising and lowering the injected surfactant concentration in a surfactant-flooding process for a fractured matrix reservoir, the injected surfactant can be more effectively utilized.

In the practice of this invention, the concentration of surface active agent necessary to satisfactorily reduce the interfacial tension between the reservoir oil and water is first determined by routine experimentation. At the beginning of the injection cycle, the concentration of the surface active agent in the injected solution is established at a level which is considerably greater than the desired concentration. During the process, the concentration of the surface active agent in the fluids at the producing well is periodically measured. When the surface active agent in the produced fluids rises and approaches the desired concentration, the concentration in the injected fluids is reduced to the desired concentration. Injection at the desired concentration is continued until the measured concentration at the producing well decreases and approaches the desired level. At this time the injected concentration is again increased to a higher value. The process is cyclically repeated.

The primary object of this invention is to improve the surfactant water-flooding process in fractured matrix reservoirs. Another object is to improve the economics of surfactant injection in the waterflood of a fractured matrix reservoir. Another object is to reduce the quantity of surfactant employed in waterflooding a fractured matrix reservoir. These and other objects of the invention will be apparent in the following description of the invention.

DETAILED DESCRIPTION OF THE INVENTION

Figure 1:
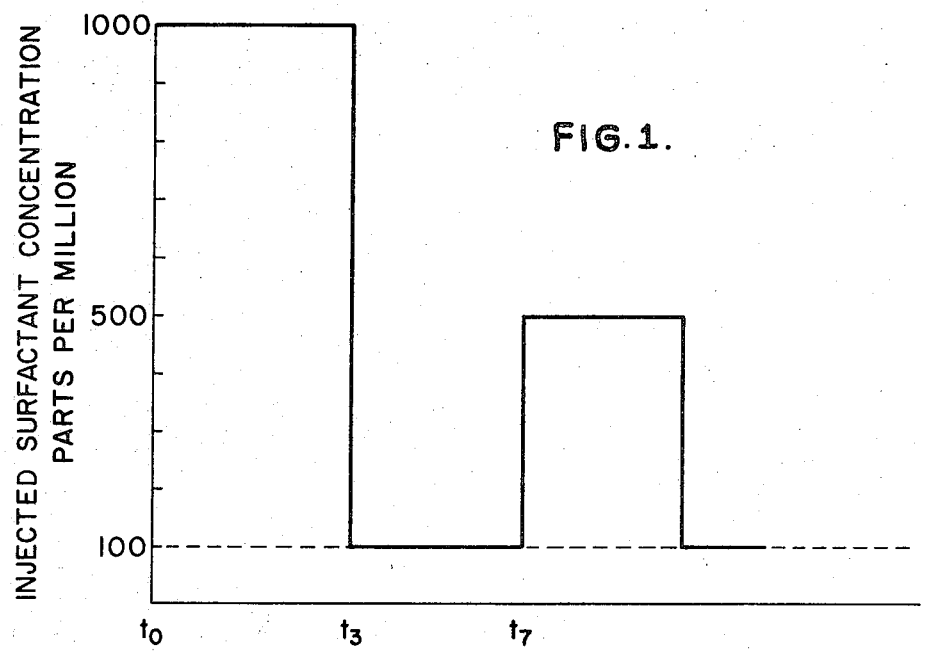
FIG. 1 is a graphical representation of the surfactant concentration in the injected solution at an injection well during a given time period.

It has been found that, in the surfactant waterflooding of a fractured matrix reservoir, the distribution of the surfactant in the reservoir is generally highly irregular; the concentration of the surfactant at or near the injection well is extremely high and the concentration at or near the withdrawal well is at a relatively low value. This irregular distribution of surfactant concentration within the reservoir has an adverse effect on the efficiency of the recovery process.

The primary use of surfactants in waterflooding operations is to reduce the interfacial tension between oil and water. It has been found that an increase in the surfactant concentration up to a given concentration will lower the interfacial tension. Beyond this point, however, further increases in the surfactant concentration will have little effect on further lowering of the interfacial tension. Therefore, where the surfactant concentration in a reservoir is highly irregular, the surfactant concentration at a given point may be above the concentration at which the maximum effect in lowering interfacial tension is realized and in other areas may be far below the concentration necessary to give effective reduction of the interfacial tension.

In the process of this invention, the surfactant concentration throughout the recovery area is adjusted to more closely approach the concentration which will give an adequate lowering of interfacial tension. Such a concentration is referred to herein as the desired concentration. A primary purpose of this process is to achieve a surfactant concentration throughout the recovery area which is relatively uniform and which is at or near the desired surfactant concentration.

In most recovery techniques for fractured matrix reservoirs, imbibition plays a large role in the recovery of oil from the rock matrix. Imbibition is a specific application of the capillary rise phenomena.

Imbibition depends upon water being drawn into the small pores within the matrix rock and oil being expelled from larger pores. The imbibition process can be simply viewed as occurring in a U-tube which extends into the rock matrix. Both ends of the U-tube are exposed to the fracture system at the face of the rock matrix with one end having a smaller radius than the other. The actual geometry of the pore spaces within the rock matrix is, of course, much more complex than a simple U-tube. Within the rock matrix there are a multitude of interconnecting pore spaces of various sizes. The recovery mechanism occuring within this complex network can, however, be simplified and more easily explained by analogy to a simple U-tube.

Where the U-tube exists in a water-wet system and is filled with oil and the fracture system filled with water, there will be a tendency for the water to be drawn into the small capillary and for oil to be expelled from the large capillary. The tendency of water to be drawn into the small capillary is directly proportional to the interfacial tension between the wetting phase—water—and the nonwetting phase—oil—and inversely proportional to the radius of the capillary. The same forces operate against the expulsion of oil from the large diameter capillary. This force represents a resistance to flow of the oil from the large diameter capillary and is directly proportional to the interfacial tension between the oil within the capillary and the water in the fracture system and inversely proportional to the radius of the large diameter capillary. It can be readily seen that, when the interfacial tension between the oil and the water is the same at the interfaces in both branches of the U-tube, the net driving force tending to pull water into the small capillary and to expel oil from the large capillary is a function of the radii of the two capillaries.

When surface active agents are used in conjunction with the imbibition production technique, their primary purpose is to lower the interfacial tension between the oil and water phases. Ideally, this lowering of interfacial tension would be best accomplished if it would operate only within the fracture system and not in the small diameter pores within the rock matrix. In this manner interfacial tension would be high where it has the beneficial effect of drawing water into the rock matrix and low where where it interferes with oil production. As a practical matter, however, it is impossible to prevent the encroachment of surfactant into the rock matrix.

The water which imbibed into the small capillaries carried with it surfactant in solution. The surfactant concentration within the pores of the matrix may be slightly lower due to the tendency of many surface active agents to adsorb or adhere to the rock surface of the capillary, but significant amounts of surfactant are still present at an undesirable location.

The process of this invention maximizes the distribution of surfactant in desirable locations—the fractures—and minimizes the distribution in undesirable locations—the rock matrix. The method by which this result is accomplished will be more clearly understood with reference to the drawings.

The initial step in the practice of the process of this invention is to determine the desirable surfactant concentration. For purposes of illustration in FIGS. 1 and 2, it is assumed that the desired surfactant concentration is 100 p.p.m. The initially injected surfactant concentration is many times higher than the desired surfactant concentration and as shown in FIG. 1 is initially established at a level of 1,000 p.p.m. The surfactant concentration is maintained at this level throughout the initial injection cycle between times $t_0$ and $t_3$.

Figure 2:
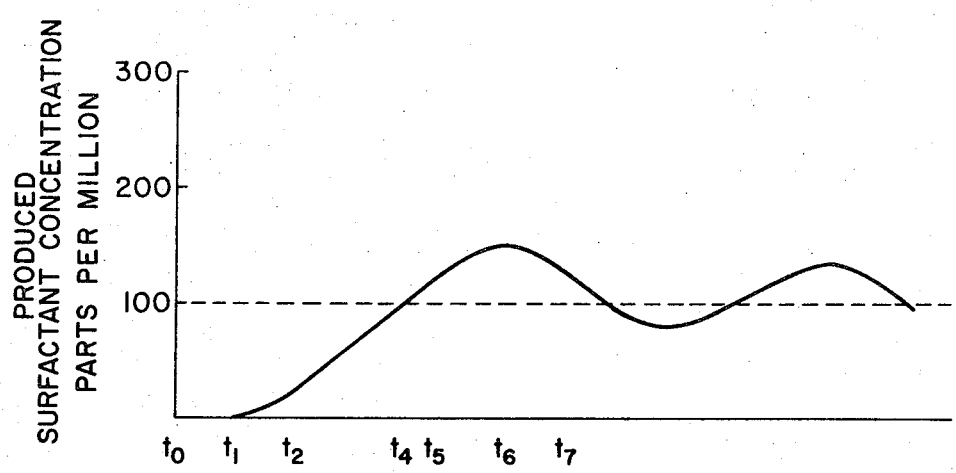
FIG. 2 is a graphical representation of the surfactant concentration in the produced fluids at a producing well during the same time period.

The produced fluids at the withdrawal well are sampled either periodically or continuously for the presence of surfactant. FIG. 2 shows the surfactant concentration in the produced fluids as determined from such monitoring. As shown in FIG. 2 the presence of surfactant in the produced fluids is first detected at a time $t_1$. Following the first arrival of surfactant at the producing well the surfactant concentration in the produced fluids will increase with time. The increasing surfactant concentration at the producing well during the time period following $t_1$ will generate a curve similar to that shown in FIG. 2. From the slope of the curve generated subsequent to time $t_1$, the point is time at which the surfactant concentration at the producing well will reach the desired surfactant concentration, 100 p.p.m. can be readily determined. This point in time is shown in FIG. 2 at $t_4$.

After the surfactant concentration in the produced fluids at the withdrawal well has reached the desired level, the surfactant concentration in the injected fluids may be reduced. It is preferred to reduce the surfactant concentration at a time shortly prior to this, however, in order to prevent excessive use of surfactant. As can be seen by comparing FIGS. 1 and 2, the arrival of surfactant at the producing well lags the injection of this surfactant at the input well. This time lag is shown in FIG. 2 by the time interval $t_0 - t_1$. It is preferred, therefore, to decrease the surfactant concentration at the input well prior to the time at which the surfactant concentration at the withdrawal well is expected to reach the desired level. The point is time at which the surfactant concentration in the input well is reduced is shown in FIG. 1 at $t_3$.

During the period $t_3 - t_7$ of reduced surfactant concentration in the injected fluids, the high concentration surfactant which has permeated the rock matrix will diffuse from the matrix into the fracture system. The withdrawal of surfactant from the rock matrix will not be total; a portion will be held within the interstices of the matrix rocks. However, a substantial portion will travel from the matrix into the fracture system where it is available to reduce the interfacial tension within the fracture system. As shown in FIG. 2 during the time period of reduced surfactant concentration in the injected fluids, the surfactant concentration in the produced fluids will continue to rise due to this diffusion. The rate of rise at the producing well will generally decrease subsequent to the time $t_5$ when the reduction in surfactant concentration in the injected fluids is first detected at the withdrawal well. The rise in surfactant concentration in the produced fluids will continue until a time $t_6$ at which the produced surfactant concentration will begin to decrease and approach the desired surfactant concentration.

During the decline in produced surfactant concentration the point in time at which the surfactant concentration will reach the desired level can be estimated. For example, as shown in FIG. 2 at time $t_7$ the slope of the curve of the surfactant concentration in the produced fluids can be reasonably established. With the lag time between injection and production of fluids known and the time at which the surfactant concentrations in the produced fluids will reach the desired level known, the point at which the surfactant concentration in the injected fluids should be again increased can be readily estimated. This is shown in FIG. 1 at time $t_7$.

During subsequent cycles of increased surfactant concentrations in the injected fluids it will normally not be necessary to use the extremely high concentrations employed in the first cycle. The purpose of this initially high concentration is to insure that the desired surfactant concentration is reached throughout the fracture system within the shortest time which is economically feasible. Generally, this initial concentration should be from 2 to 10 times the desired concentration.

During subsequent cycles the surfactant concentration throughout the fracture system is at or near the desired surfactant concentration and, therefore, an extremely high injected surfactant concentration would not be as beneficial as in the earlier cycle and would generally be an excessive use of surfactant. As shown in FIG. 1 the surfactant concentration in the injected fluids in subsequent cycles normally should be reduced to one-half or less of the concentration initially employed. These lower concentrations will cause the rate of increase of surfactant concentrations in the produced fluids to decrease in slope as shown in FIG. 2. But, as also shown in FIG. 2, the surfactant concentration in the produced fluid and therefore throughout the fracture system will be maintained at or near the desired surfactant concentration. In subsequent cycles of increased surfactant concentration, the concentration may be further reduced. It is only necessary to maintain the surfactant concentration at or near the desired concentration throughout the fracture system. This can be determined by the monitoring of the surfactant concentration at the recovery well.

A number of beneficial effects can be realized with the use of this technique. By utilizing an initial high injected surfactant concentration, a relatively short period of time will lapse before the desired surfactant concentration is realized throughout the fracture system. By decreasing the surfactant concentration when such a level is realized within the reservoir, surfactant will be withdrawn from the rock matrix where it serves little purpose and in fact, can be detrimental to imbibition and placed in the fracture system where it is needed to lower the interfacial tension between the oil being expelled and the aqueous phase within the fracture. The surfactant within the rock media will be withdrawn and placed into the fracture system according to the laws of diffusion. That is, the more highly concentrated surfactant solutions within the rock matrix will diffuse from the matrix into the fracture system when the surfactant concentration within the fracture system is at a lower concentration than within the rock matrix.

The desired concentration level for surfactant in the fracture system will be determined from the concentration of surfactant necessary to give adequate reductions of interfacial tension between the formation oil and water at reservoir conditions. Generally, a concentration which will reduce the interfacial tension between the oil and water below 10 dynes per centimeter will be satisfactory, although it is preferred that the interfacial tension be reduced below 5 dynes per centimeter. This is primarily a question of economics, however, and a higher interfacial tension might be acceptable if a lower interfacial tension could only be obtained at inordinate costs.

Suitable surface active agents which may be employed in the practice of this invention may include any of the numerous available surface active agents which have the ability to satisfactorily lower the interfacial tension between oil and water and which will not render the surface of the rock matrix oil wet. Such surfactants can be readily chosen by one skilled in the art from routine laboratory investigation and consultation of published literature such as Schwartz, Perry, and Berch, "Surface Active Agents and Detergents," Interscience Publishers, Inc., New York, 1958. A particularly suitable surfactant for use in the practice of this invention is Benax 2A–1 manufactured by Dow Chemical Company, Midland, Michigan.

The surfactant concentration at the producing well can be determined by a number of methods well known to those skilled in the art. The measurement may be made by a direct analysis of the interfacial tension between the produced aqueous phase containing the surfactant and the formation crude oil. Preferably the surfactant concentration is measured by other analyses such as the foam height test, absorption spectroscopy, or ultraviolet analysis.

We claim:

1. An improved method of recovering oil from a subterranean formation penetrated by at least one input well and at least one outlet well by injecting an aqueous surfactant solution into the formation by means of an input well, displacing the solution into the formation, and recovering fluids from an outlet well in which the improvement comprises first injecting a surfactant solution into the formation and subsequently injecting a second surfactant solution into the reservoir, wherein the concentration of surfactant in the second solution is less than the surfactant concentration in the first solution and wherein the second surfactant is injected into the reservoir when the concentration of surfactant in the recovered fluids increases and approaches the concentration of the first solution.

2. An improved method for recovering oil from a fractured matrix reservoir penetrated by at least one input well and at least one outlet well by displacing an aqueous surfactant solution through the reservoir, said surfactant solution having a desired surfactant concentration which will reduce the interfacial tension between the oil and the solution to less than 10 dynes per centimeter, and recovering fluids from the outlet well in which the improvement comprises:
   a. injecting a surfactant solution by means of an input well into the reservoir, wherein the concentration of surfactant in the solution is from 5 to 10 times greater than the desired concentration;
   b. reducing the surfactant concentration in the injected surfactant solution when the surfactant concentration in the recovered fluids increases and approaches the desired concentration; and
   c. increasing the concentration of the surfactant in the injected surfactant solution to a level greater than the desired concentration when the concentration of surfactant in the recovered fluids decreases and approaches the desired concentration.

3. An improved method of recovering oil from a subterranean formation by injecting a surfactant solution at a desired concentration into the formation, displacing oil through the formation with the surfactant solution, and recovering oil and surfactant solution from the formation in which the improvement comprises changing the concentration of the surfactant in the injected solution when the concentration of the surfactant in the recovered solution approaches the desired concentration.

4. An improved method of recovering oil from a subterranean formation penetrated by at least one input well and at least one outlet well by injecting an aqueous surfactant solution into the formation by means of an input well, displacing the solution into the formation, and recovering fluids from an outlet well in which the improvement comprises first injecting a surfactant solution into the formation and subsequently injecting a second surfactant solution into the reservoir, wherein the concentration of surfactant in the second solution is less than the surfactant concentration in the first solution and wherein the concentration of the injected surfactant solution is increased to a level greater than the reduced concentration when the concentration of surfactant in the recovered fluids decreases and approaches the reduced concentration.

5. An improved method of recovering oil from a subterranean formation penetrated by at least one input well and at least one outlet well by injecting an aqueous surfactant solution into the formation by means of an input well, displacing the solution in the formation, and recovering fluids from an outlet well in which the improvement comprises increasing the surfactant concentration in the formation to near a desired level and maintaining the surfactant concentration at about said desired level by first injecting a solution containing surfactant at a given level, then making a first change in the surfactant concentration in the injected solution to a level different than the given level, and subsequently making a second change in the surfactant concentration to a level different than the surfactant concentration of the first change, wherein the changes in the concentration of the surfactant in the injected solution are made when the surfactant concentration in the produced fluids approaches the desired level.